(12) United States Patent
Hirashima et al.

(10) Patent No.: US 8,699,170 B2
(45) Date of Patent: Apr. 15, 2014

(54) VIRTUAL TAPE DEVICE AND CLEANING CONTROL METHOD

(71) Applicant: Fujitsu Limited, Kawasaki (JP)

(72) Inventors: Nobuyuki Hirashima, Nagano (JP); Fumio Matsuo, Nagano (JP); Katsuo Enohara, Kawaguchi (JP); Takaaki Yamato, Nagano (JP); Tetsuya Kinoshita, Nagano (JP); Takashi Murayama, Nagano (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/690,572

(22) Filed: Nov. 30, 2012

(65) Prior Publication Data
US 2013/0201580 A1 Aug. 8, 2013

(30) Foreign Application Priority Data
Feb. 2, 2012 (JP) ................................ 2012-021287

(51) Int. Cl.
*G11B 19/02* (2006.01)
*G06F 12/00* (2006.01)
*G06F 15/16* (2006.01)

(52) U.S. Cl.
USPC .............. 360/69; 711/111; 711/154; 709/223

(58) Field of Classification Search
None
See application file for complete search history.

(56) References Cited

U.S. PATENT DOCUMENTS 7,308,528 B2 * 12/2007 Kitamura et al. ............. 711/111
7,779,110 B2 * 8/2010 Basham et al. ............... 709/223

FOREIGN PATENT DOCUMENTS

| JP | 01-256013 | 10/1989 |
|----|-----------|---------|
| JP | 07-302131 | 11/1995 |
| JP | 2003-331408 | 11/2003 |

* cited by examiner

*Primary Examiner* — Andrew L Sniezek
(74) *Attorney, Agent, or Firm* — Staas & Halsey LLP (57) ABSTRACT

A virtual tape device includes a first drive group of virtual tape drives, a first determination unit, and a first instruction unit. The first drive group is assigned to a first information processing apparatus. The first determination unit determines, upon receiving a first cleaning instruction for cleaning a first virtual tape drive included in the first drive group from the first information processing apparatus, whether the first cleaning instruction is to be output to a physical tape device connected to the virtual tape device. The first instruction unit instructs, when the first determination unit determines that the first cleaning instruction is to be output to the physical tape device, a first physical tape drive corresponding to the first virtual tape drive to perform cleaning. The first physical tape drive is included in the physical tape device.

7 Claims, 10 Drawing Sheets

VIRTUAL TAPE DEVICE AND CLEANING CONTROL METHOD

CROSS-REFERENCE TO RELATED APPLICATION

This application is based upon and claims the benefit of priority of the prior Japanese Patent Application No. 2012-021287, filed on Feb. 2, 2012, the entire contents of which are incorporated herein by reference.

FIELD

The embodiments discussed herein are related to a virtual tape device.

BACKGROUND

In general, a system including a tape library device which stores data in a tape cartridge of a magnetic tape or the like and a disk array device which virtually stores the data stored in the tape library device has been used as a virtual tape system.

Figure 8:
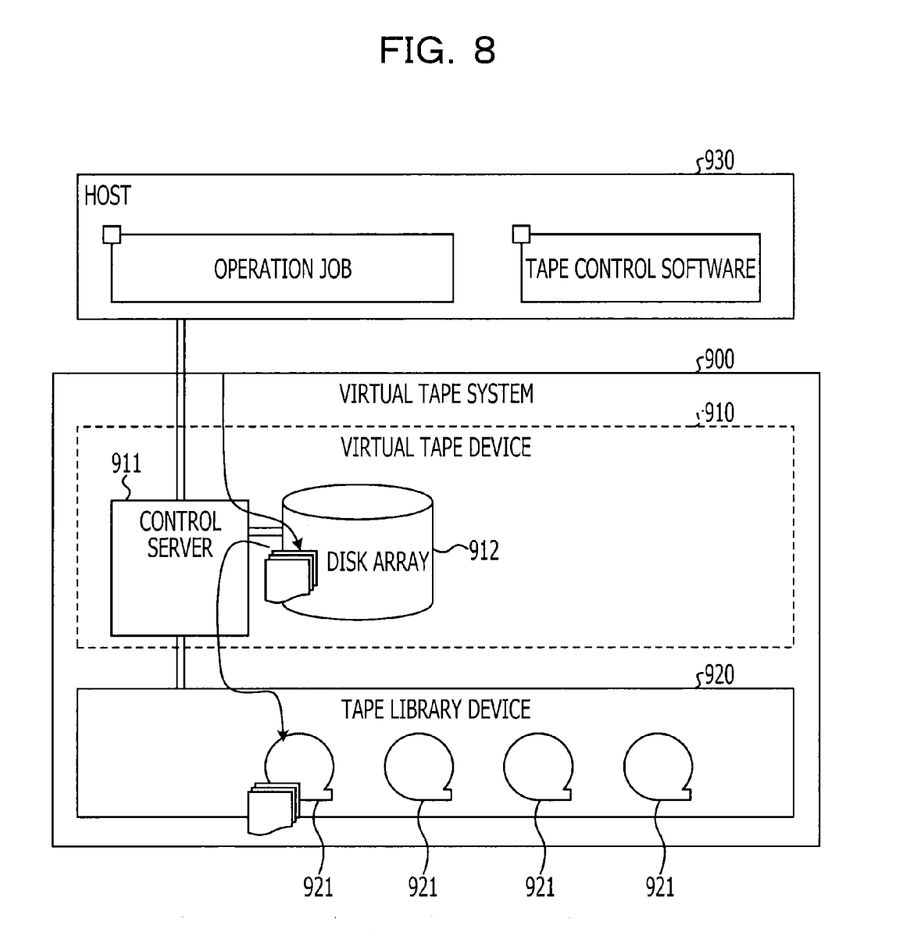
FIG. 8 is a diagram illustrating a configuration of a general virtual tape system.

A general virtual tape system will be described with reference to FIG. 8. FIG. 8 is a diagram illustrating a configuration of a general virtual tape system. As illustrated in FIG. 8, a virtual tape system 900 includes a virtual tape device 910 and a tape library device 920. The virtual tape system 900 is communicably connected to a host 930 which is a higher-level device.

The virtual tape device 910 includes a control server 911 and a disk array 912 and virtualizes the control server 911 and the disk array 912 as a tape library. That is, the virtual tape device 910 causes the host 930 to recognize that the tape library is directly connected to the host 930. The virtual tape device 910 is actually connected to the tape library device 920 at a back-end. The tape library device 920 includes tape drives 921 to which tape cartridges are to be mounted. Data written by the host 930 is temporarily written in the disk array 912, and thereafter, also written in one of the tape cartridges.

Each of the tape drives 921 allows a tape cartridge to be mounted and writes data to and reads data from the mounted tape cartridge using a magnetic head. When data is written and read a certain number of times, the magnetic head gets dirty. In this case, an error occurs frequently when data is written or read, and accordingly, retry is frequently performed. Therefore, the magnetic head is to be cleaned.

Figure 9:
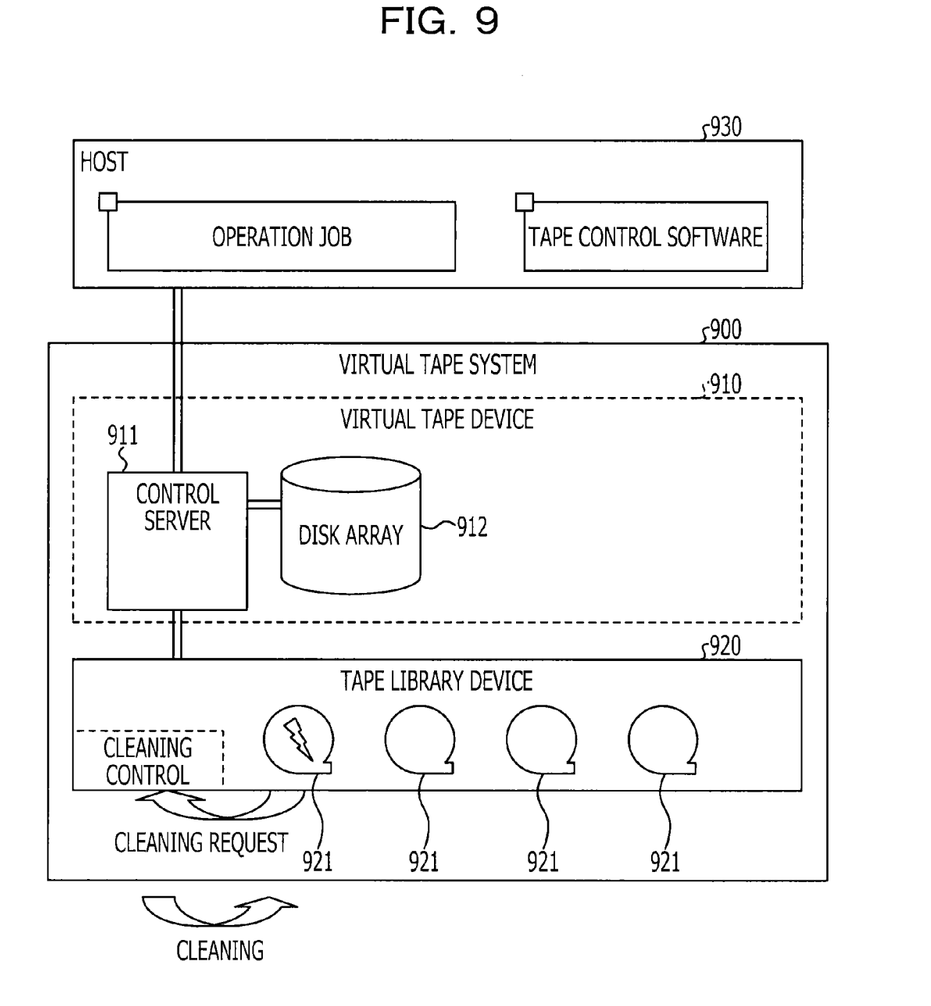
FIG. 9 is a diagram illustrating general cleaning control.

FIG. 9 is a diagram illustrating general cleaning control. In the example of FIG. 9, the tape library device 920 has a cleaning control function. Specifically, the tape library device 920 executes the cleaning control and when receiving a cleaning request from one of the tape drives 921, the tape library device 920 cleans a magnetic head of the tape drive 921 which has issued the cleaning request.

Some tape library devices do not have the cleaning control function. Such a tape library device does not automatically perform cleaning of tape drives. Therefore, a user temporarily interrupts operation, manually performs cleaning of the tape drives, and thereafter, the operation is started again.

In a magnetic tape device connected to a higher-level device, a technique is employed in which the magnetic tape device adds up lengths corresponding to movements of a tape. When a value obtained by the adding up reaches a preset value, the magnetic tape device requests the higher-level device to perform cleaning, until the cleaning is executed, every time an instruction for unloading a magnetic tape is issued from the higher-level device.

Japanese Laid-open Patent Publication No. 01-256013, Japanese Laid-open Patent Publication No. 07-302131, and Japanese Laid-open Patent Publication No. 2003-331408 disclose related techniques.

A general virtual tape system has a problem in that a host is not capable of managing cleaning of tape drives. In a case of a tape library device having a cleaning control function, since the tape library device performs cleaning control, a host which is not directly connected to the tape library device is not capable of managing cleaning of tape drives. Also in a case of a tape library device which does not have a cleaning control function, since the tape library device is not capable of performing cleaning control, a host which is not directly connected to the tape library device is also not capable of managing cleaning of tape drives.

In a case of a magnetic tape device which is connected to a higher-level device, if a device corresponding to a virtual tape device is disposed between the higher-level device and the magnetic tape device, the magnetic tape device is not capable of transmitting a cleaning request to the higher-level device, and accordingly, the higher-level device is not capable of transmitting a cleaning request to tape drives.

As illustrated in FIG. 9, in the general cleaning control, tape control software describing a function of controlling cleaning of tape drives is installed in a host in some cases. In this case, the host is capable of controlling the tape library device by executing the tape control software installed in the host when the tape library device is directly connected to the host, and otherwise, the host is not capable of controlling the tape library device. Accordingly, the host is not capable of controlling cleaning of the tape drives included in the tape library device.

Note that the problems described above occur not only in magnetic heads of tape drives but also in reading heads and writing heads for general tapes such as paper tapes.

SUMMARY

According to an aspect of the present invention, provided is a virtual tape device including a first drive group of virtual tape drives, a first determination unit, and a first instruction unit. The first drive group is assigned to a first information processing apparatus. The first determination unit determines, upon receiving a first cleaning instruction for cleaning a first virtual tape drive included in the first drive group from the first information processing apparatus, whether the first cleaning instruction is to be output to a physical tape device connected to the virtual tape device. The first instruction unit instructs, when the first determination unit determines that the first cleaning instruction is to be output to the physical tape device, a first physical tape drive corresponding to the first virtual tape drive to perform cleaning. The first physical tape drive is included in the physical tape device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, a virtual tape device and a cleaning control method according to embodiments disclosed in this application will be described in detail with reference to the accompanying drawings. Note that the technique is not limited to the embodiments. The embodiments may be appropriately combined with each other as long as no conflict in processing occurs. Hereinafter, a case where this technique is employed in a virtual tape system will be described.

First Embodiment

Configuration of Virtual Tape System

Figure 1:
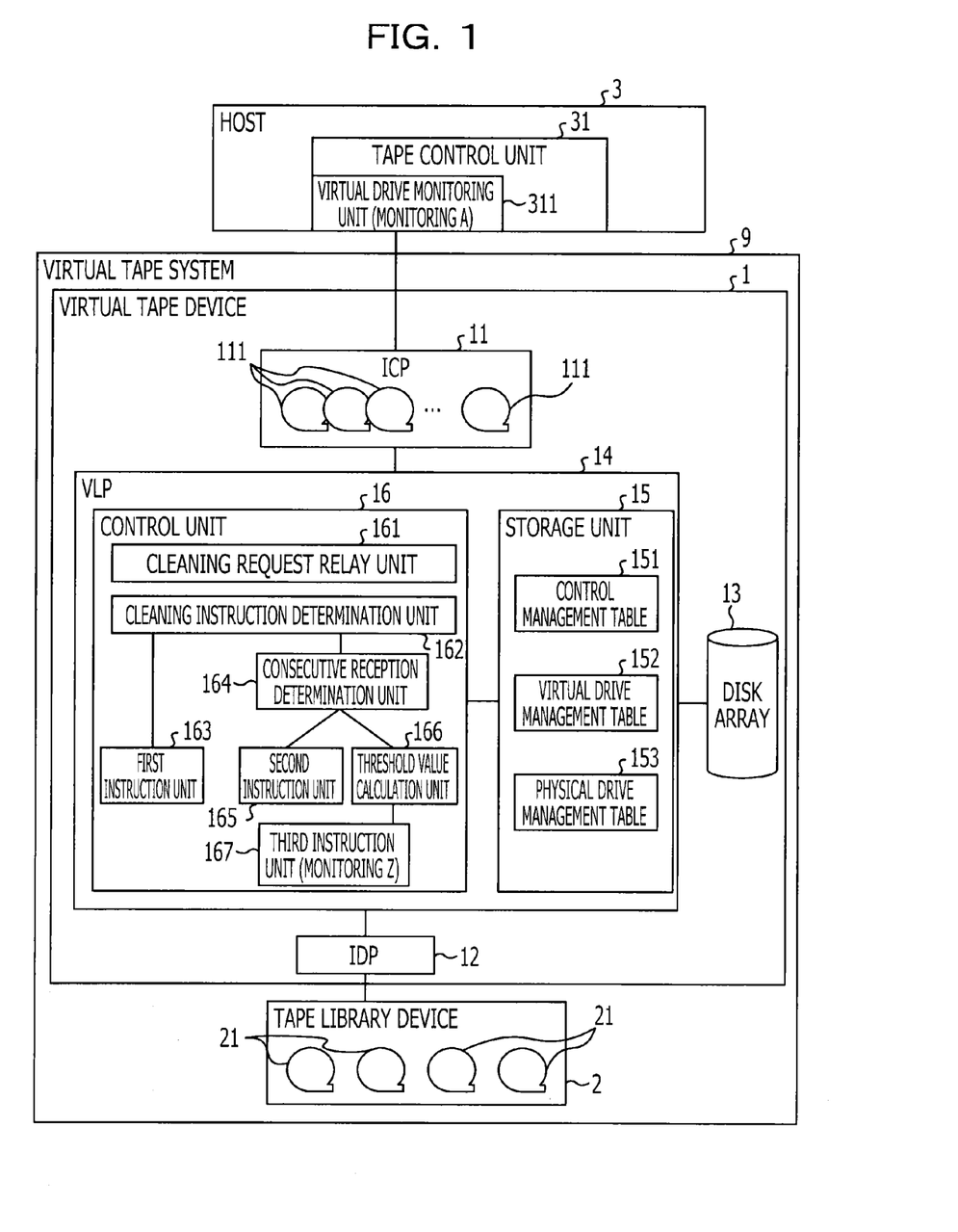
FIG. 1 is a diagram illustrating a functional configuration of a virtual tape system according to a first embodiment.

FIG. 1 is a diagram illustrating a functional configuration of a virtual tape system according to a first embodiment. As illustrated in FIG. 1, a virtual tape system 9 includes a virtual tape device 1 and a tape library device 2. The virtual tape system 9 is communicably connected to a host 3.

The tape library device 2 includes physical tape drives 21. Each physical tape drive 21 allows a tape cartridge to be mounted and reads and writes data in actual operation of the virtual tape system 9. The number of the physical tape drives 21 is not limited to that illustrated in FIG. 1 and may be changed.

The virtual tape device 1 virtualizes the tape library device 2. The virtual tape device 1 includes an ICP (Integrated Channel Processor) 11, an IDP (Integrated Device Processor) 12, a disk array 13, and a VLP (Virtual Library Processor) 14.

The disk array 13 virtually stores data. The disk array 13 is a TVC (Tape Volume Cache), for example. The ICP 11 configures virtual tape drives 111 using the disk array 13 and controls an interface to the host 3 using the configured virtual tape drives 111. The virtual tape drive 111 virtually stores data stored in a tape cartridge. Note that the number of the virtual tape drives 111 is not limited to that illustrated in FIG. 1 and may be changed.

The IDP 12 controls an interface to the tape library device 2. The VLP 14 manages the disk array 13 and controls the entire virtual tape device 1. The VLP 14 includes a storage unit 15 and a control unit 16.

The storage unit 15 is a storage device of a semiconductor memory device, such as a RAM (random access memory) or a flash memory. The storage unit 15 includes a control management table 151, a virtual drive management table 152, and a physical drive management table 153.

The control management table 151 stores, in association with each virtual tape drive 111, information used for cleaning control. The control management table 151 is updated by a cleaning request relay unit 161 and a threshold value calculation unit 166, for example, which will be described later.

The virtual drive management table 152 stores, in association with each virtual tape drive 111, a usage time of each virtual tape drive 111, that is, total time in which virtual tapes have been mounted on each virtual tape drive 111. The virtual drive management table 152 is updated, for example, by the ICP 11 through the VLP 14.

The physical drive management table 153 stores, in association with each physical tape drive 21, a usage time of each physical tape drive 21, that is, total time in which tape cartridges have been mounted on each physical tape drive 21. The physical drive management table 153 is updated by the VLP 14, for example. The tables will be described in detail later.

The control unit 16 performs cleaning control on the physical tape drives 21 included in the tape library device 2. For example, upon receiving an instruction for cleaning one virtual tape drive 111 assigned to the host 3, the control unit 16 determines whether the cleaning instruction is to be output to the tape library device 2 which is connected to the virtual tape device 1. Upon determining that the cleaning instruction is to be output to the tape library device 2, the control unit 16 transmits the cleaning instruction to one of the physical tape drives 21 included in the tape library device 2, which corresponds to the one virtual tape drive 111 which is a target of the cleaning instruction.

The cleaning instruction supplied from the host 3 is issued by a tape control unit 31 which is realized by executing tape control software installed in the host 3, for example. The tape control unit 31 issues the cleaning instruction through one of the virtual tape drives 111 so as to cause the virtual tape device 1 to perform three types of cleaning process described below on the physical tape drives 21. As a first cleaning process, when one of the physical tape drives 21 issues a cleaning request, the virtual tape device 1 performs cleaning on the physical tape drive 21 which issues the cleaning request. The first cleaning process is referred to as "cleaning requested by a physical tape drive". As a second cleaning process, when a predetermined period of time has been elapsed, the virtual tape device 1 successively performs cleaning on all the physical tape drives 21. The second cleaning process is referred to as "periodic cleaning". As a third cleaning process, when a usage time of one of the physical tape drives 21 exceeds a predetermined threshold value, the virtual tape device 1 performs cleaning on the physical tape drive 21 having the usage time exceeding the threshold value. The third cleaning process is referred to as "cleaning performed when a usage time exceeds a threshold value". As described above, the tape control unit 31 issues a cleaning instruction through one of the virtual tape drives 111 so as to cause the virtual tape device 1 to perform these cleaning processes. Thereafter, the control unit 16 converts the cleaning instruction supplied from the tape control unit 31 into an appropriate instruction so as to instruct the physical tape drives 21 to perform cleaning.

The control unit 16 may be, for example, an integrated circuit such as an ASIC (application specific integrated circuit) or an FPGA (Field Programmable Gate Array), or may be an integrated circuit such as a CPU (central processing unit) or an MPU (micro processing unit). The control unit 16 includes the cleaning request relay unit 161, a cleaning instruction determination unit 162, a first instruction unit 163, a consecutive reception determination unit 164, a second instruction unit 165, the threshold value calculation unit 166, and a third instruction unit 167.

When receiving a cleaning request from one of the physical tape drives 21 included in the tape library device 2, the cleaning request relay unit 161 selects a virtual tape drive 111 on which no virtual tape is not currently mounted. Thereafter, the cleaning request relay unit 161 relays the request for cleaning the selected virtual tape drive 111 to the host 3. Specifically, the cleaning request relay unit 161 prompts the tape control unit 31 included in the host 3 to issue an instruction for cleaning the selected virtual tape drives 111.

Furthermore, the cleaning request relay unit 161 turns on a "cleaning request flag" representing that a cleaning request has been issued to the host 3. In the first cleaning process, the cleaning request relay unit 161 causes the host 3 to issue an instruction for cleaning an unused virtual tape drive 111 instead of the physical tape drive 21 which has issued the cleaning request.

Upon receiving the instruction for cleaning the virtual tape drive 111 from the host 3, the cleaning instruction determination unit 162 determines whether the cleaning instruction is to be output to the tape library device 2. For example, upon receiving the instruction for cleaning the virtual tape drive 111 from the host 3, the cleaning instruction determination unit 162 determines whether the cleaning request flag is "ON".

When the cleaning request flag is "ON", the cleaning instruction determination unit 162 determines that the cleaning instruction is to be output to the tape library device 2. Specifically, the cleaning instruction determination unit 162 determines that the cleaning instruction is an instruction for performing the "cleaning requested by a physical tape drive". Thereafter, the cleaning instruction determination unit 162 instructs the first instruction unit 163 to perform cleaning on the virtual tape drive 111.

When it is determined that the cleaning request flag is not "ON", the cleaning instruction determination unit 162 determines that the cleaning instruction is not to be output to the tape library device 2. Specifically, the cleaning instruction determination unit 162 determines that the cleaning instruction is an instruction for performing the cleaning performed when a usage time exceeds a threshold value. Thereafter, the cleaning instruction determination unit 162 outputs the instruction for cleaning the virtual tape drive 111 to the consecutive reception determination unit 164.

Figure 2:
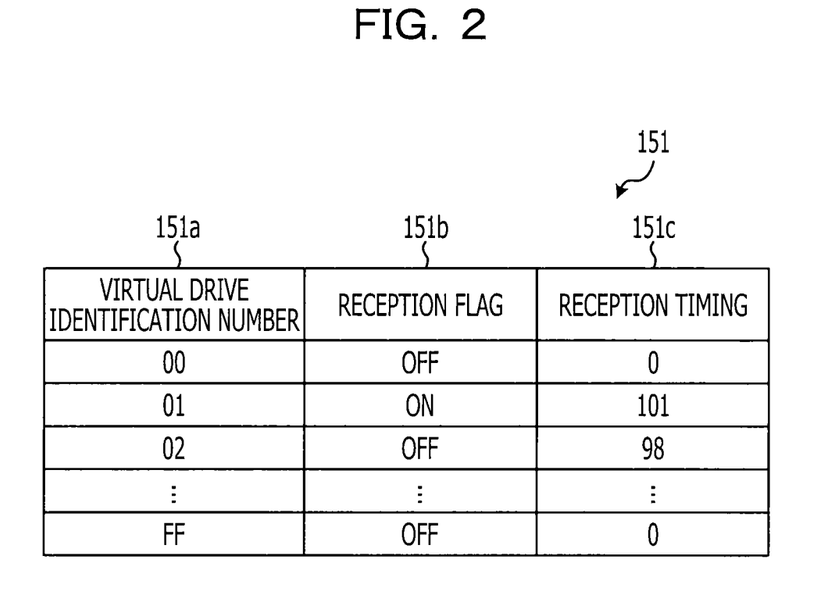
FIG. 2 is a diagram illustrating a data configuration of a control management table according to the first embodiment.

Furthermore, the cleaning instruction determination unit 162 turns on a "reception flag" in the control management table 151, which will be described hereinafter, in association with the virtual tape drive 111. The reception flag represents that an instruction for cleaning a virtual tape drive has been received. A data configuration of the control management table 151 will be described with reference to FIG. 2. FIG. 2 is a diagram illustrating an example of a data configuration of the control management table 151 according to the first embodiment.

As illustrated in FIG. 2, the control management table 151 stores a virtual drive identification number 151*a*, a reception flag 151*b*, and a reception timing 151*c* in association with one another. The virtual drive identification number 151*a* represents an identification number of a virtual tape drive 111. The reception flag 151*b* represents whether an instruction for cleaning the virtual tape drive 111 represented by the virtual drive identification number 151*a* has been received. For example, when the instruction for cleaning the virtual tape drive 111 has been received, "ON" is set, and otherwise, "OFF" is set. The reception flag 151*b* is set by the cleaning instruction determination unit 162 as described above. The reception timing 151*c* represents usage time of the virtual tape drive 111 at the time when the cleaning instruction is received. The reception timing 151*c* is set by the threshold value calculation unit 166, which will be described later, when the instruction for cleaning the virtual tape drive 111 is received.

In the example of the control management table 151 illustrated in FIG. 2, a reception flag 151*b* storing "OFF" and a reception timing 151*c* storing "0" hours are associated with a virtual drive identification number 151*a* storing "00". Furthermore, a reception flag 151*b* storing "ON" and a reception timing 151*c* storing "101" hours are associated with a virtual drive identification number 151*a* storing "01".

Referring back to FIG. 1, the first instruction unit 163 replaces the virtual tape drive 111 which is instructed to be cleaned by the host 3 with the physical tape drive 21 which has requested the cleaning and instructs the physical tape drive 21 to perform cleaning. In other words, the first instruction unit 163 performs the "cleaning requested by a physical tape drive". The first instruction unit 163 turns off the reception flag 151*b* corresponding to the virtual tape drive 111 which is instructed to be cleaned by the host 3 in the control management table 151 so as to reset the reception flag 151*b*. Furthermore, the first instruction unit 163 turns off the cleaning request flag so as to reset the cleaning request flag.

The consecutive reception determination unit 164 determines whether an instruction for cleaning a virtual tape drive 111 which is the target of the cleaning instruction supplied from the host 3 and instructions for cleaning other virtual tape drives 111 have been issued within a predetermined period of time. For example, the consecutive reception determination unit 164 determines whether two or more instructions for cleaning a virtual tape drive 111 have been received within a predetermined period of time before an instruction for cleaning a virtual tape drive 111 is received. The determination as to whether instructions for cleaning a virtual tape drive 111 is made using the reception flags 151*b* of the control management table 151.

Furthermore, upon determining that the instruction for cleaning the virtual tape drive 111 which is the target of the cleaning instruction and the instructions for cleaning other virtual tape drives 111 have been issued within the predetermined period of time, the consecutive reception determination unit 164 determines that the cleaning instructions are consecutively received. That is, the consecutive reception determination unit 164 determines that the periodic cleaning in which all the physical tape drives 21 are successively cleaned in a certain cycle is performed. Thereafter, the consecutive reception determination unit 164 instructs the second instruction unit 165 to perform the periodic cleaning.

Upon determining that the instruction for cleaning the virtual tape drive 111 which is the target of the cleaning instruction and the instructions for cleaning other virtual tape drives 111 have not been issued within the predetermined period of time, the consecutive reception determination unit 164 determines that the cleaning instructions are not consecutively received. That is, the consecutive reception determination unit 164 determines that the cleaning performed when a usage time exceeds a threshold value is performed. Thereafter, the consecutive reception determination unit 164 instructs the threshold value calculation unit 166 to calculate a threshold value which specifies timing when the physical tape drives 21 are cleaned.

The second instruction unit 165 instructs all the physical tape drives 21 included in the tape library device 2 to perform cleaning. Specifically, the second instruction unit 165 converts the instruction for cleaning the virtual tape drive 111 supplied from the tape control unit 31 into instructions for periodically cleaning the physical tape drives 21 so that the cleaning of the physical tape drives 21 is performed. In other words, the second instruction unit 165 performs the "periodic cleaning". Furthermore, the second instruction unit 165 turns off the reception flags 151b corresponding to all the virtual tape drives 111 in the control management table 151 so as to reset the reception flags 151b.

The threshold value calculation unit 166 calculates a threshold value for usage times of the virtual tape drives 111 which is used in the host 3 and sets the obtained threshold value as a threshold value for usage times of the physical tape drives 21. The threshold value calculation unit 166 performs the calculation for the cleaning performed when a usage time exceeds a threshold value.

Here, a demand for the calculation of the threshold value for usage times of the virtual tape drives 111 will be described. First, in the tape control unit 31 included in the host 3, a virtual drive monitoring unit 311 monitors usage times of the virtual tape drives 111, for example. When one of the usage times of the virtual tape drives 111 exceeds the predetermined threshold value, the virtual drive monitoring unit 311 issues an instruction for cleaning the virtual tape drive 111 having the usage time which exceeds the threshold value. However, the virtual drive monitoring unit 311 is not capable of monitoring usage states of the physical tape drives 21 included in the tape library device 2 which is not directly connected to the host 3. On the other hand, the tape library device 2 is not capable of notifying the tape control unit 31 included in the host 3 which is not directly connected to the tape library device 2 of the usage states of the physical tape drives 21 included in the tape library device 2. Therefore, the threshold value calculation unit 166 calculates the threshold value for the usage times of the virtual tape drives 111, which is used in the monitoring performed by the virtual drive monitoring unit 311. Specifically, in the virtual drive monitoring unit 311, a cleaning condition used in monitoring (monitoring A) is defined as "a case where a mount time (usage time) of a tape cartridge on a drive exceeds a threshold value of 100 hours after a previous cleaning process". In this case, the threshold value calculation unit 166 estimates the threshold value of 100 hours. Then the threshold value calculation unit 166 reflects the estimated threshold value to the monitoring of the usage times of the physical tape drives 21.

For example, when an instruction for cleaning a virtual tape drive 111 is issued, the threshold value calculation unit 166 reads a usage time the virtual tape drive 111 from the virtual drive management table 152. Then the threshold value calculation unit 166 records the read usage time in the control management table 151 as a reception timing 151c which corresponds to the virtual tape drive 111 which is a target of the cleaning instruction. Thereafter, the threshold value calculation unit 166 resets, in the virtual drive management table 152, the usage time of the virtual tape drive 111 which is the target of the cleaning instruction. This operation is performed to reliably add up the usage time of the virtual tape drive 111 which is the target of the cleaning instruction until a next cleaning instruction is issued. Then the threshold value calculation unit 166 calculates an average usage time at which the host 3 issues a cleaning instruction, by using reception timings 151c stored for plural virtual tape drives 111 in the control management table 151. As an example, the threshold value calculation unit 166 calculates an average value of usage times of three of the virtual tape drives 111 assigned to the host 3. By this, the threshold value calculation unit 166 may estimate the threshold value used for the monitoring (monitoring A) of the usage times of the virtual tape drives 111 performed by the virtual drive monitoring unit 311 and may reflect the estimated threshold value to the usage times of the physical tape drives 21 (monitoring Z).

Furthermore, threshold value calculation unit 166 turns off the reception flags 151b in the control management table 151 so as to reset the reception flags 151b for all the virtual tape drives 111.

Although a case where the threshold value calculation unit 166 uses the usage times of three of the virtual tape drives 111 assigned to the host 3 when the average value of the usage times of the virtual tape drives 111 is calculated has been described, this technique is not limited to this. The threshold value calculation unit 166 may use usage times of four of the virtual tape drives 111 or usage times of five of the virtual tape drives 111. Furthermore, the threshold value calculation unit 166 may use usage times of one quarter of the virtual tape drives 111 assigned to the host 3. When the number of virtual tape drives 111 used for the calculation is increased, the threshold value calculation unit 166 may accurately calculate the threshold value used by the virtual drive monitoring unit 311.

By using the usage time obtained by the threshold value calculation unit 166 as a threshold value, the third instruction unit 167 issues a cleaning instruction to a physical tape drives 21 having a usage time exceeding the threshold value. For example, the third instruction unit 167 monitors the usage times of the physical tape drives 21 by using the physical drive management table 153. Specifically, the third instruction unit 167 reads the usage times of the physical tape drives 21 stored in the physical drive management table 153 in a certain cycle and determines whether the read usage time of each physical tape drive 21 exceeds the threshold value. When determining that at least one of the usage times of the physical tape drives 21 exceeds the threshold value, the third instruction unit 167 instructs the physical tape drives 21 having the usage times exceeding the threshold value to perform cleaning. In other words, the third instruction unit 167 performs the cleaning performed when a usage time exceeds a threshold value.

Figure 3:
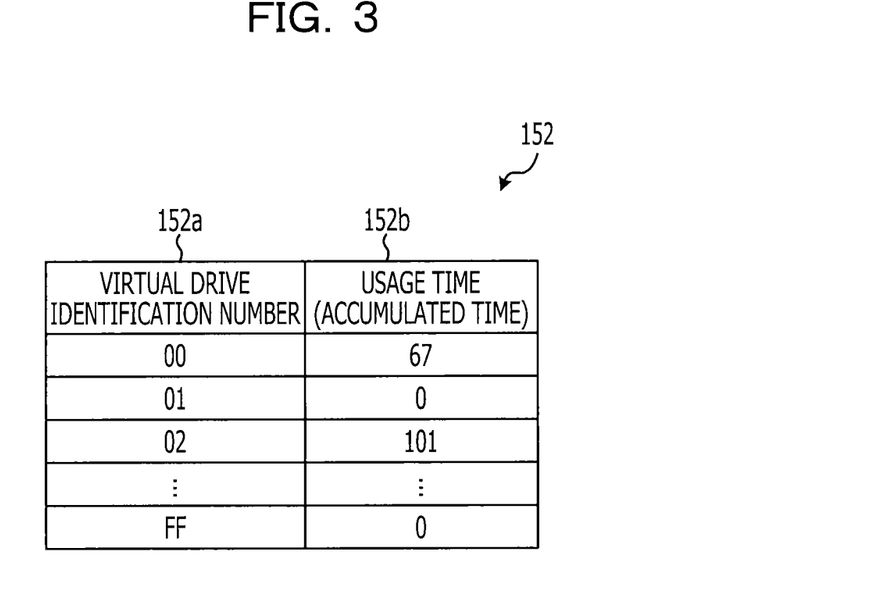
FIG. 3 is a diagram illustrating a data configuration of a virtual drive management table according to the first embodiment.

Next, a data configuration of the virtual drive management table 152 will be described with reference to FIG. 3. FIG. 3 is a diagram illustrating a data configuration of the virtual drive management table 152 according to the first embodiment. As illustrated in FIG. 3, the virtual drive management table 152 stores a virtual drive identification number 152a and a usage time 152b in association with each other. The virtual drive identification number 152a represents an identification number of a virtual tape drive 111. The usage time 152b represents an accumulated time in which virtual tapes have been mounted on the virtual tape drive 111.

In the example of the virtual drive management table 152 illustrated in FIG. 3, a usage time 152b storing "67" is associated with a virtual drive identification number 152a storing "00". Furthermore, a usage time 152b storing "0" is associated with a virtual drive identification number 152a storing "01".

Figure 4:
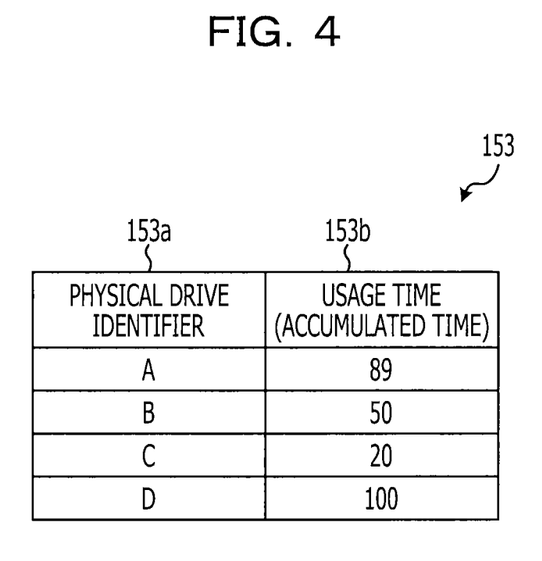
FIG. 4 is a diagram illustrating a data configuration of a physical drive management table according to the first embodiment.

Next, a data configuration of the physical drive management table 153 will be described with reference to FIG. 4. FIG. 4 is a diagram illustrating a data configuration of the physical drive management table 153 according to the first embodiment. As illustrated in FIG. 4, the physical drive management table 153 stores a physical drive identifier 153a and a usage time 153b in association with each other. The physical drive identifier 153a is an identifier of a physical tape drive 21. The usage time 153b represents an accumulated time in which tape cartridges have been mounted on the physical tape drive 21.

In the example of the physical drive management table 153 illustrated in FIG. 4, a usage time 153b storing "89" is associated with a physical drive identifier 153a storing "A". Furthermore, a usage time 153b storing "50" is associated with a physical drive identifier 153a storing "B".

Procedure of Cleaning Control Process

Figure 5A:
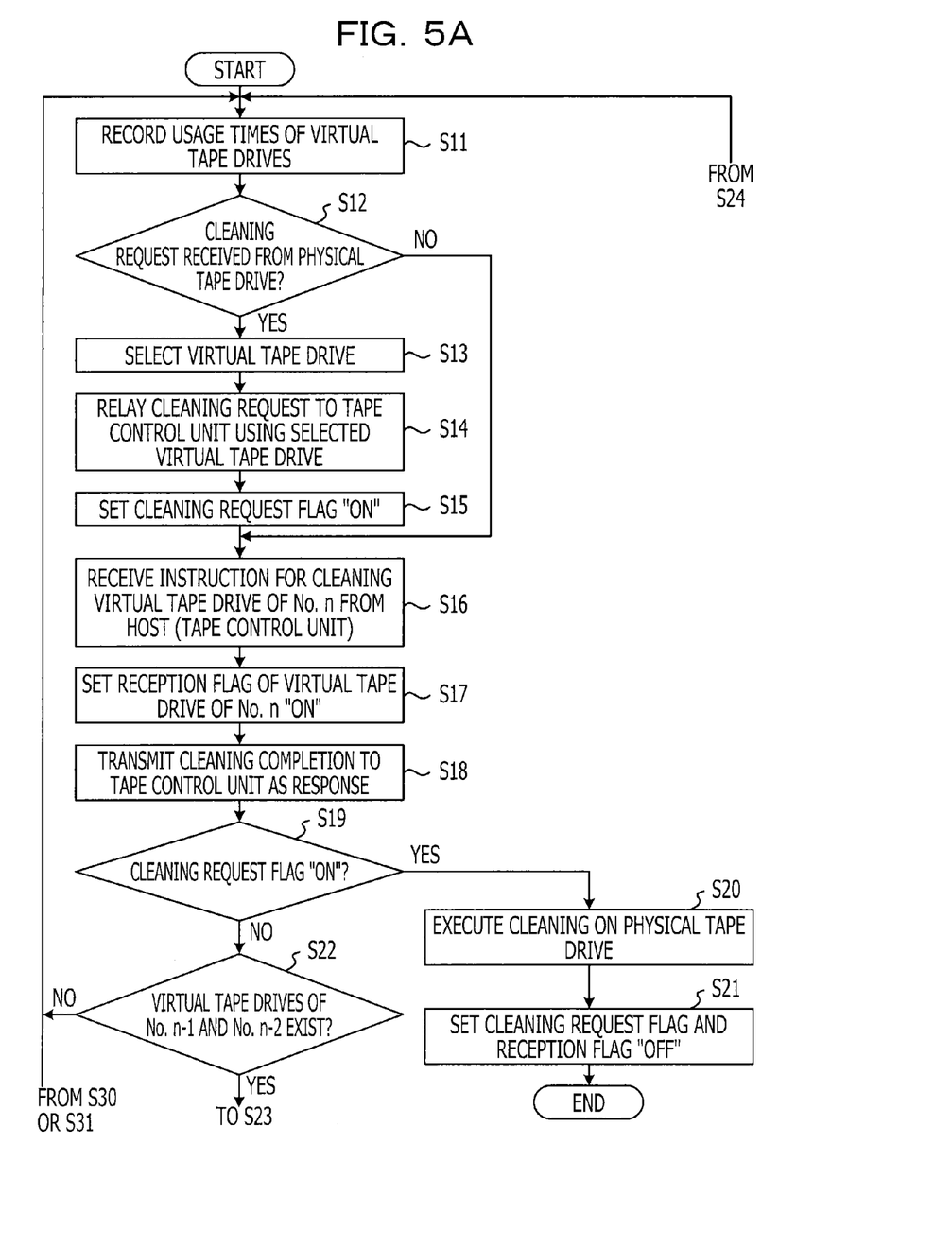
FIGS. 5A and 5B are diagrams illustrating an operation flow of a cleaning control process according to the first embodiment.
Figure 5B:
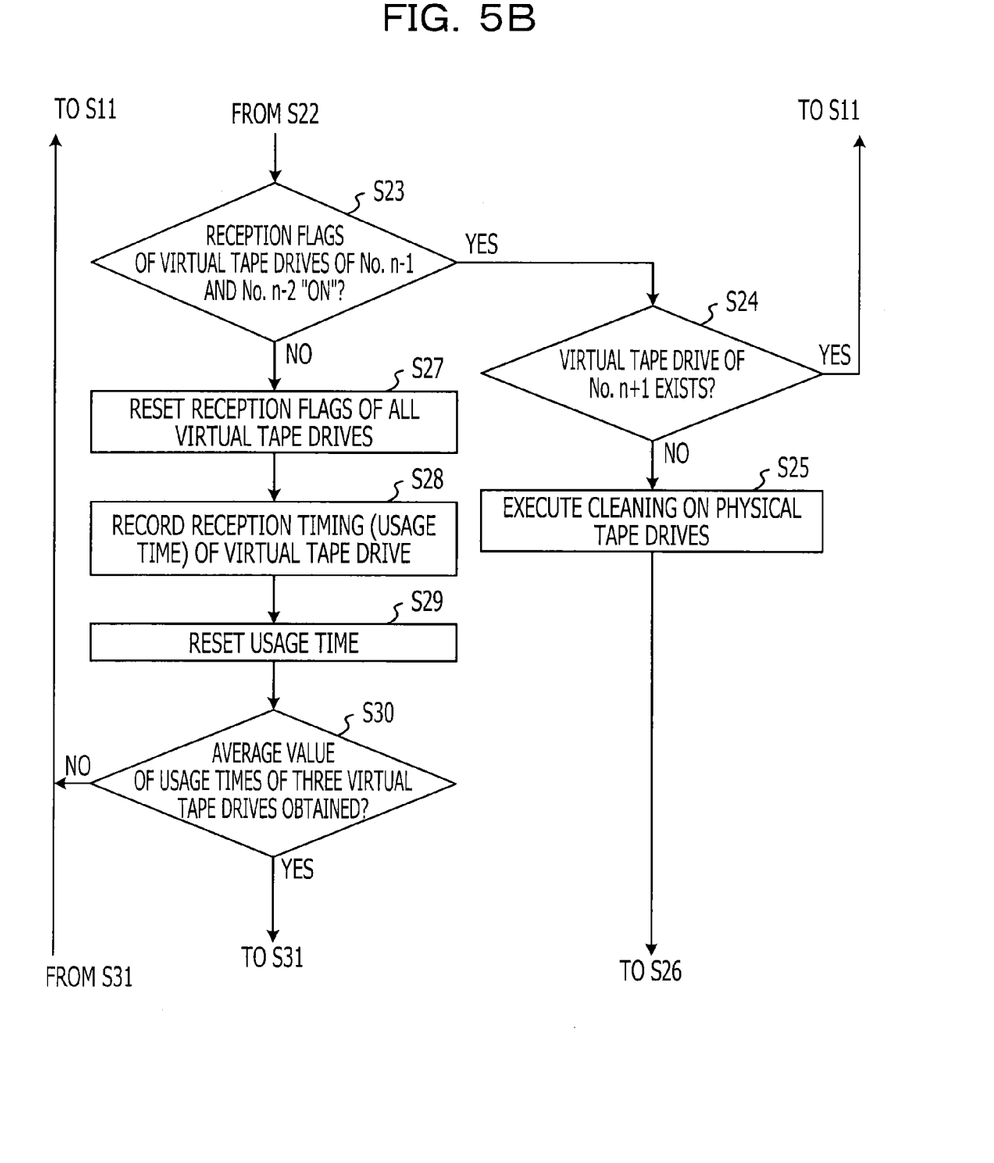
Figure 6:
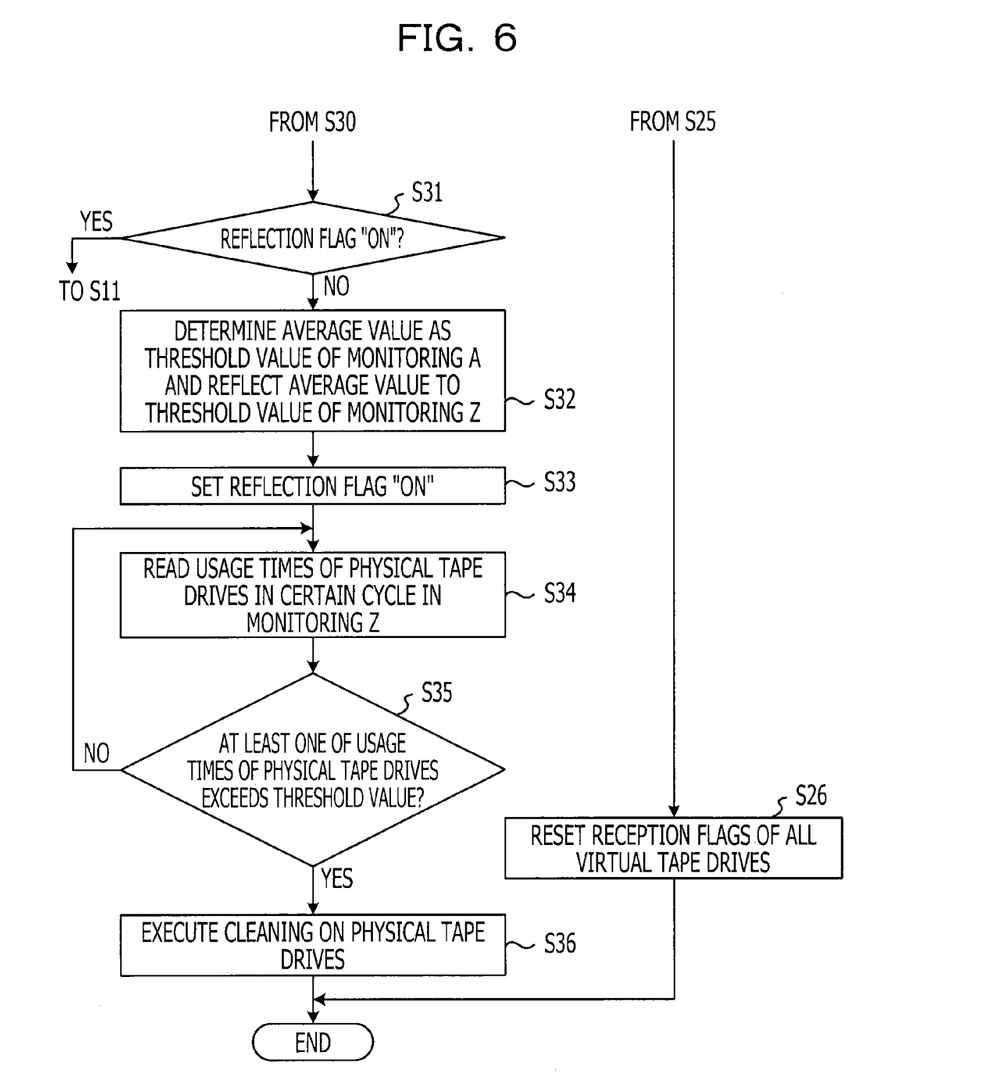
FIG. 6 is a diagram illustrating an operation flow of a cleaning control process according to the first embodiment.

Next, a procedure of a cleaning control process will be described with reference to FIGS. 5A, 5B, and 6. FIGS. 5A, 5B, and 6 are diagrams illustrating an operation flow of the cleaning control process according to the first embodiment. It is assumed that the plurality of virtual tape drives 111 are assigned to the host 3. In FIGS. 5A and 5B, identification numbers of the virtual tape drives 111 are represented by "No. n" (n represents natural numbers equal to or larger than 1). In the periodic cleaning, the host 3 successively issues cleaning instructions in ascending order of the identification numbers of the virtual tape drives 111.

In the ICP 11, the usage times of the virtual tape drives 111 are recorded in the virtual drive management table 152 (S11). In the VLP 14, the cleaning request relay unit 161 determines whether a cleaning request has been received from one of the physical tape drives 21 included in the tape library device 2 (S12). When the cleaning request has not been received from the physical tape drives 21 (S12; No), the cleaning request relay unit 161 advances the process to S16 to receive an instruction for cleaning one of the virtual tape drives 111.

On the other hand, when the cleaning request has been received from one of the physical tape drives 21 included in the tape library device 2 (S12; Yes), the cleaning request relay unit 161 selects one of the virtual tape drives 111 on which a virtual tape is not currently mounted (S13). Then the cleaning request relay unit 161 relays the cleaning request to the tape control unit 31 by using the selected one of the virtual tape drives 111 (S14). The cleaning request relay unit 161 turns a "cleaning request flag" on (S15). Thereafter, the cleaning request relay unit 161 advances the process to S16 to receive an instruction for cleaning one of the virtual tape drives 111.

Subsequently, the cleaning instruction determination unit 162 receives from the host 3 an instruction for cleaning a virtual tape drive 111 of No. n (S16). It is assumed that the cleaning instruction determination unit 162 receives the cleaning instruction from the virtual drive monitoring unit 311 included in the host 3. Thereafter, the cleaning instruction determination unit 162 turns on a reception flag 151b, which represents that the instruction for cleaning the virtual tape drive 111 of No. n has been received, in the control management table 151 (S17). Then the cleaning instruction determination unit 162 notifies the tape control unit 31 of completion of the cleaning performed in response to the cleaning instruction (S18). Here, the cleaning completion is transmitted before a cleaning process in response to the cleaning instruction is performed since a next process is allowed to be performed in a virtual layer (in the VLP 14) while the cleaning process is performed in a physical layer (in the tape library device 2, for example). Specifically, stuck of processes in the virtual layer is suppressed.

Subsequently, the cleaning instruction determination unit 162 determines whether the cleaning request flag is "ON" (S19). When it is determined that the cleaning request flag is "ON" (S19; Yes), the first instruction unit 163 performs cleaning on the physical tape drive 21 from which the cleaning request is received (S20). That is, the first instruction unit 163 performs the cleaning requested by a physical tape drive. Then the first instruction unit 163 turns off the cleaning request flag so as to reset the cleaning request flag. The first instruction unit 163 turns off the reception flag 151b in the control management table 151 for the virtual tape drive 111 of No. n so as to reset the reception flag 151b (S21). The cleaning control process is thus terminated.

When it is determined that the cleaning request flag is not "ON" (S19; No), the consecutive reception determination unit 164 determines whether virtual tape drives 111 of No. n−1 and No. n−2 exist (S22). When the received cleaning instruction is for cleaning a virtual tape drive 111 having an identification number "00", the consecutive reception determination unit 164 determines that virtual tape drives 111 of No. n−1 and No. n−2 do not exist since identification numbers "−01" and "−02" do not exist. When the received cleaning instruction is for cleaning a virtual tape drive 111 having an identification number "01", the consecutive reception determination unit 164 determines that virtual tape drives 111 of No. n−1 and No. n−2 do not exist since an identification number "00" exists but an identification number "−01" does not exist. When the received cleaning instruction is for cleaning a virtual tape drive 111 having an identification number "02", the consecutive reception determination unit 164 determines that virtual tape drives 111 of No. n−1 and No. n−2 exist since identification numbers "00" and "01" exist.

When it is determined that the virtual tape drive 111 of No. n−1 or No. n−2 does not exist (S22; No), the consecutive reception determination unit 164 advances the process to S11 to receive a next cleaning instruction. On the other hand, when it is determined that both the virtual tape drives 111 of No. n−1 and No. n−2 exist (S22; Yes), the consecutive reception determination unit 164 determines whether reception flags of the virtual tape drives 111 of No. n−1 and No. n−2 are "ON" (S23).

When the reception flags of both the virtual tape drives 111 of No. n−1 and No. n−2 are "ON" (S23; Yes), the consecutive reception determination unit 164 determines that consecutive reception of cleaning instructions is going. That is, the consecutive reception determination unit 164 determines that the periodic cleaning is performed. The consecutive reception determination unit 164 determines whether a virtual tape drive 111 of No. n+1 exists so as to determine whether a further consecutive reception has been performed (S24). This operation is performed so that periodic cleaning is suspended in a case where a next instruction for cleaning one of the virtual tape drives 111 is further issued and the periodic cleaning is performed when all instructions are received.

When it is determined that a virtual tape drive 111 of No. n+1 exists (S24; Yes), the consecutive reception determination unit 164 advances the process to S11 to receive a next cleaning instruction. On the other hand, when it is determined that a virtual tape drive 111 of No. n+1 does not exist (S24; No), the second instruction unit 165 executes cleaning on all the physical tape drives 21 included in the tape library device 2 (S25). That is, the second instruction unit 165 performs the periodic cleaning. Then the second instruction unit 165 turns off the reception flags 151b in the control management table 151 for all the virtual tape drives 111 so as to reset the reception flags 151b (S26). Then the cleaning control process is terminated.

When it is determined that at least one of the reception flags 151b of the virtual tape drives 111 of No. n−1 and No. n−2 is not "ON" (S23; No), the consecutive reception determination unit 164 determines that consecutive reception of cleaning instructions is not going. That is, the consecutive reception determination unit 164 determines that the cleaning performed when a usage time exceeds a threshold value is performed.

Subsequently, the threshold value calculation unit 166 turns off the reception flags 151b in the control management table 151 for all the virtual tape drives 111 so as to reset the reception flags 151b (S27). Then the threshold value calculation unit 166 reads a usage time of the virtual tape drive 111 of No. n from the virtual drive management table 152 and records the read usage time as a reception timing in the control management table 151 (S28). Thereafter, the threshold value calculation unit 166 resets the usage time included in the virtual drive management table 152 for the virtual tape drive 111 of No. n (S29).

Then the threshold value calculation unit 166 determines whether an average value of usage times of three of the virtual tape drives 111 has been obtained (S30). For example, the threshold value calculation unit 166 calculates, as a threshold value, an average usage time of cleaning instructions issued by the host 3 using reception timings stored in the control management table 151 for three of the virtual tape drives 111. When reception timings of three of the virtual tape drives 111 have been stored in the control management table 151, the threshold value calculation unit 166 obtains an average value of the reception timings and determines that an average value of the usage times of the virtual tape drives 111 is obtained. On the other hand, when the reception timings of three of the virtual tape drives 111 have not been stored in the control management table 151, the threshold value calculation unit 166 determines that an average value of the usage times of the virtual tape drives 111 is not obtained. When an average value of the usage times of three of the virtual tape drives 111 is not obtained (S30; No), the threshold value calculation unit 166 advances the process to S11 to receive a next cleaning instruction.

On the other hand, when an average value of the usage times of three of the virtual tape drives 111 is obtained (S30; Yes), the threshold value calculation unit 166 determines whether a "reflection flag" is "ON" (S31). Here, the reflection flag represents whether the threshold value used by the tape control unit 31 has been reflected in the monitoring of the usage times of the physical tape drives 21. For example, when the threshold value is reflected, "ON" is set, and otherwise, "OFF" is set.

When it is determined that the reflection flag is "ON" (S31; Yes), the threshold value calculation unit 166 advances the process to S11 to receive a next cleaning instruction since the threshold value has been reflected. On the other hand, when it is determined that the reflection flag is not "ON" (S31; No), the threshold value calculation unit 166 determines the obtained average value of the usage times of the virtual tape drives 111 as a threshold value used in the monitoring A and reflects the average value to a threshold value used in the monitoring Z (S32). Then the threshold value calculation unit 166 turns the reflection flag on (S33).

Thereafter, the third instruction unit 167 periodically reads, in the monitoring Z, the usage times of the physical tape drives 21 from the physical drive management table 153 (S34). Then the third instruction unit 167 determines whether at least one of the usage times of the physical tape drives 21 exceeds the threshold value (S35). When it is determined that any one of the usage times of the physical tape drives 21 does not exceed the threshold value (S35; No), the third instruction unit 167 advances the process to S34 to continue the monitoring.

On the other hand, when it is determined that at least one of the usage times of the physical tape drives 21 exceeds the threshold value (S35; Yes), the third instruction unit 167 performs cleaning on the physical tape drive 21 having the usage time exceeding the threshold value (S36). That is, the third instruction unit 167 performs the cleaning performed when a usage time exceeds a threshold value. Then the cleaning control process is terminated.

In the periodic cleaning, the case where the host 3 successively issues cleaning instructions in ascending order of the identification numbers of the virtual tape drives 111 has been described. However, the operation of the host 3 is not limited to this and the host 3 may successively issue cleaning instructions in descending order of the identification numbers of the virtual tape drives 111. In this case, in 522, the consecutive reception determination unit 164 may determine whether virtual tape drives 111 of No. n+1 and No. n+2 exist. Furthermore, in this case, in S24, the consecutive reception determination unit 164 determines whether a virtual tape drive 111 of No. n−1 exists so as to determine whether a further consecutive reception is performed.

In the first embodiment described above, the case where the single host 3 is connected to the virtual tape device 1 has been described. However, a plurality of hosts 3 may be connected to the virtual tape device 1. Next, a case where a plurality of hosts 3, specifically, two hosts 3, are connected to the virtual tape device 1 will be described as a second embodiment.

Second Embodiment

Figure 7:
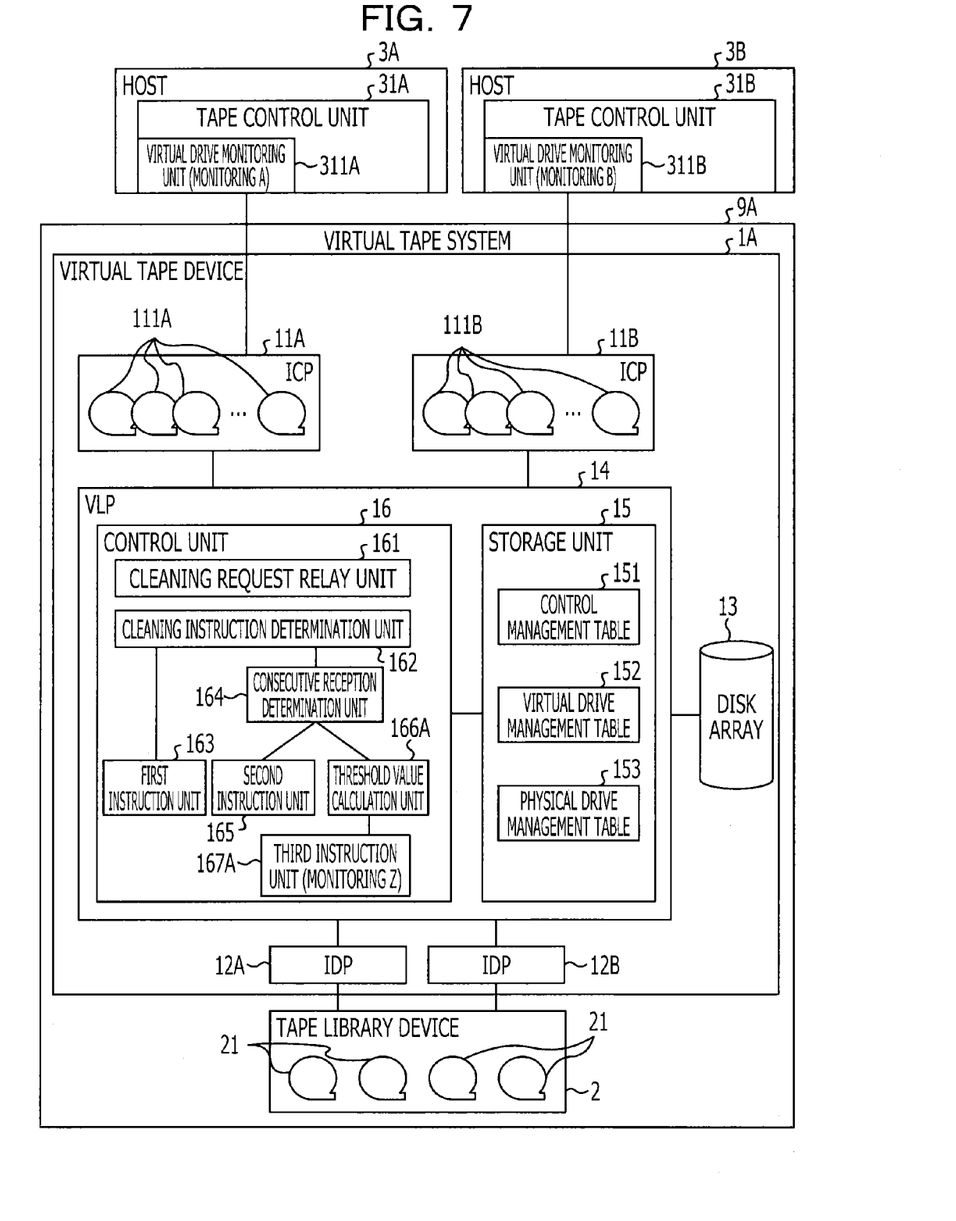
FIG. 7 is a diagram illustrating a functional configuration of a virtual tape system according to a second embodiment.

FIG. 7 is a diagram illustrating a functional configuration of a virtual tape system according to a second embodiment. Note that components the same as those of the virtual tape device 1 illustrated in FIG. 1 are denoted by reference numerals the same as those illustrated in FIG. 1, and redundant descriptions of the same components and the same operations are omitted. The second embodiment is different from the first embodiment in that two hosts 3A and 3B are connected to a virtual tape device 1A included in a virtual tape system 9A.

The host 3A includes a tape control unit 31A which is realized by executing tape control software installed in the host 3A. The tape control unit 31A includes a virtual drive monitoring unit 311A. The host 3B includes a tape control unit 31B which is realized by executing tape control software installed in the host 3B. The tape control unit 31B includes a virtual drive monitoring unit 311B. In the virtual drive monitoring units 311A and 311B, respective cleaning conditions for monitoring are defined by a user in advance. For example, in the virtual drive monitoring unit 311A, "a case where a mount time (a usage time) of a tape cartridge on a drive exceeds a threshold value of 100 hours after a previous cleaning process" is defined as a cleaning condition used in monitoring (monitoring A). Furthermore, in the virtual drive monitoring unit 311B, "a case where a mount time (a usage time) of a tape cartridge on a drive exceeds a threshold value of 30 hours after a previous cleaning process" is defined as a cleaning condition used in monitoring (monitoring B).

The second embodiment is further different from the first embodiment in that the virtual tape device 1A includes two ICPs 11A and 11B.

The ICP 11A configures virtual tape drives 111A assigned to the host 3A in a disk array 13 and controls an interface to the host 3A using the constructed virtual tape drives 111A. The ICP 11B configures virtual tape drives 111B assigned to the host 3B in the disk array 13 and controls an interface to the host 3B using the configured virtual tape drives 111B.

The second embodiment is further different from the first embodiment in that the virtual tape device 1A includes two IDPs 12A and 12B. The second embodiment is further different from the first embodiment in that a threshold value calculation unit 166A is used instead of the threshold value calculation unit 166 and a third instruction unit 167A is used instead of the third instruction unit 167.

The threshold value calculation unit 166A calculates, as a threshold value, an average usage time at which the host 3A issues cleaning instructions to the virtual tape drives 111A.

Furthermore, the threshold value calculation unit 166A calculates, as a threshold value, an average usage time at which the host 3B issues cleaning instructions to the virtual tape drives 111B. Note that a method for calculating the average usage times may be the same as that employed in the threshold value calculation unit 166, and therefore, a description thereof is omitted.

The third instruction unit 167A selects the smallest threshold value among threshold values obtained by the threshold value calculation unit 166A. Then the third instruction unit 167A instructs physical tape drives 21 having usage times exceeding the selected threshold value to perform cleaning. That is, the third instruction unit 167A performs cleaning on the physical tape drives 21 while preferentially employing a cleaning condition corresponding to a threshold value of the shortest period among the cleaning conditions used in the monitoring A and the monitoring B. For example, it is assumed that a threshold value for an instruction for performing cleaning on the virtual tape drives 111A assigned to the host 3A is 100 hours. Furthermore, it is assumed that a threshold value for an instruction for performing cleaning on the virtual tape drives 111B assigned to the host 3B is 30 hours. In this case, the third instruction unit 167A selects the smallest threshold value among the two threshold values, that is, 30 hours, and reflects the selected threshold value, that is, 30 hours, to the monitoring Z. Then the third instruction unit 167A instructs physical tape drives 21 having usage times exceeding the threshold value of 30 hours to perform cleaning.

By this, since the third instruction unit 167A reflects the smallest threshold value among the threshold values calculated by the threshold value calculation unit 166A to the monitoring Z, intention of the user who defined the threshold values in the tape control unit 31A and the tape control unit 31B may be respected.

Effects of Embodiments

According to the foregoing embodiments, upon receiving an instruction for cleaning a certain one of the virtual tape drives 111 assigned to the host 3 from the host 3, the virtual tape device 1 determines whether the cleaning instruction is to be output to the tape library device 2 connected to the virtual tape device 1. When determining that the cleaning instruction is to be output to the tape library device 2, the virtual tape device 1 instructs one of the physical tape drives 21 included in the tape library device 2 which corresponds to the certain one of the virtual tape drives 111 which is a target of the cleaning instruction to perform cleaning. With this configuration, the virtual tape device 1 determines the instruction for cleaning one of the virtual tape drives 111 supplied from the host 3 and instructs one of the physical tape drives 21 to perform cleaning in accordance with the determination. As a result, the host 3 may manage the cleaning performed on the physical tape drives 21.

According to the foregoing embodiments, upon receiving a cleaning request from one of the physical tape drives 21 included in the tape library device 2, the virtual tape device 1 selects one of the virtual tape drives 111 on which a virtual tape is not currently mounted. Then the virtual tape device 1 relays the request for cleaning the selected one of the virtual tape drives 111 to the host 3. Upon receiving the instruction for cleaning one of the virtual tape drives 111 from the host 3, the virtual tape device 1 determines that the cleaning instruction is to be output to the tape library device 2. Furthermore, the virtual tape device 1 instructs one of the physical tape drives 21 from which the cleaning request is received to perform cleaning. With this configuration, the virtual tape device 1 uses one of the virtual tape drives 111 on which a virtual tape is not mounted to relay the cleaning request to the host 3 and instructs one of the physical tape drives 21 from which the cleaning request is received to perform cleaning. As a result, the host 3 may manage the cleaning performed in response to the cleaning request supplied from one of the physical tape drives 21.

According to the foregoing embodiments, when it is determined that the cleaning instruction is not to be output to the tape library device 2, the virtual tape device 1 performs the following process. The virtual tape device 1 determines whether the cleaning instruction and instructions for cleaning other virtual tape drives 111 different from the virtual tape drive 111 which is a target of the cleaning instruction have been issued within a predetermined period of time. When determining that the cleaning instruction and the instructions for cleaning other virtual tape drives 111 different from the virtual tape drive 111 which is the target of the cleaning instruction have been issued within the predetermined period of time, the virtual tape device 1 instructs all the physical tape drives 21 to perform cleaning. With this configuration, when at least two instructions for cleaning the virtual tape drives 111 have issued from the host 3 within the predetermined period of time, the virtual tape device 1 instructs all the physical tape drives 21 to perform cleaning. As a result, the host 3 may manage the periodic cleaning for periodically cleaning all the physical tape drives 21.

Furthermore, with this configuration, when it is determined that the cleaning instruction and the instructions for cleaning other virtual tape drives 111 different from the virtual tape drive 111 which is the target of the cleaning instruction have not been issued within the predetermined period of time, the virtual tape device 1 performs the following process. The virtual tape device 1 calculates an average usage time at which the host 3 issues instructions for cleaning the virtual tape drives 111 by using the usage time of the virtual tape drive 111 which is the target of the cleaning instruction and usage times of virtual tape drives 111 corresponding to cleaning instructions issued before the cleaning instruction. Then the virtual tape device 1 instructs physical tape drives 21 having usage times exceeding the calculated average usage time to perform cleaning. With this configuration, the virtual tape device 1 may calculate timings (usage times) at which instructions for cleaning the virtual tape drives 111 are issued by the host 3. Then the virtual tape device 1 may reflect the calculated timings to the timings at which the instructions for cleaning the physical tape drives 21 are issued. As a result, the virtual tape device 1 may perform cleaning on the physical tape drives 21 at the timings planned by the host 3. Specifically, the host 3 may manage cleaning performed in accordance with the usage times of the physical tape drives 21.

Furthermore, the virtual tape device 1 may calculate respective average usage times for issuing the instructions for cleaning the virtual tape drives 111 assigned to a plurality of hosts 3. Then the virtual tape device 1 selects the smallest one of the obtained usage times and instructs physical tape drives 21 having usage times exceeding the selected usage time to perform cleaning. With this configuration, the virtual tape device 1 may reflect the smallest one of the obtained usage times to the timings at which the instructions for cleaning the physical tape drives 21 are issued. As a result, the virtual tape device 1 may considerably reflect plans of the plurality of hosts 3.

Other Embodiment

Note that the virtual tape device 1 may be realized by an information processing apparatus such as a general personal computer, a work station, or the like, by implementing functions of the cleaning request relay unit 161, the cleaning instruction determination unit 162, and the like described above by executing software installed in the information processing apparatus.

It is not necessarily the case that components of the illustrated devices are physically configured as illustrated in the drawings. Specifically, specific conditions of separation and integration of the devices are not limited to those illustrated and all or some of the specific conditions may be functionally or physically configured in a separated or integrated manner in an arbitrary unit depending on various loads or usage conditions. For example, the cleaning instruction determination unit 162 and the consecutive reception determination unit 164 may be integrated as a single unit. On the other hand, the threshold value calculation unit 166 may be separated into a calculation unit which calculates the threshold value used by the host 3 and a reflection unit which reflects the obtained threshold value to the threshold value used to monitor the usage times of the physical tape drives 21. Furthermore, a storage unit such as the control management table 151 may be connected to the virtual tape device 1 as an external device through a network.

Furthermore, all or arbitrary some of the processing functions performed by the virtual tape device 1 may be realized by a CPU, or a micro computer such as an MPU or an MCU (micro control unit) by executing programs, or may be realized as hardware configured by a wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A virtual tape device, comprising:
    a first drive group of virtual tape drives assigned to a first information processing apparatus;
    a first determination unit to determine, upon receiving a first cleaning instruction for cleaning a first virtual tape drive included in the first drive group from the first information processing apparatus, whether the first cleaning instruction is to be output to a physical tape device connected to the virtual tape device; and
    a first instruction unit to instruct, when the first determination unit determines that the first cleaning instruction is to be output to the physical tape device, a first physical tape drive corresponding to the first virtual tape drive to perform cleaning, the first physical tape drive being included in the physical tape device.

2. The virtual tape device according to claim 1, further comprising:
    a relay unit to
        select, upon receiving a first cleaning request from a second physical tape drive included in the physical tape device, a second virtual tape drive on which a virtual tape is not currently mounted, the second virtual tape drive being included in the first drive group, and
        relay a second cleaning request for cleaning the second virtual tape drive to the first information processing apparatus,
    wherein
        the first determination unit determines, upon receiving a second cleaning instruction for cleaning the second virtual tape drive from the first information processing apparatus, that the second cleaning instruction is to be output to the physical tape device, and
        the first instruction unit instructs the second physical tape drive to perform cleaning.

3. The virtual tape device according to claim 1, further comprising:
    a second determination unit to determine, when the first determination unit determines that the first cleaning instruction is not to be output to the physical tape device, whether the first cleaning instruction and second cleaning instructions for cleaning second virtual tape drives different from the first virtual tape drive have been issued within a predetermined period of time, the second virtual tape drives being included in the first drive group; and
    a second instruction unit to instruct all physical tape drives included in the physical tape device to perform cleaning when the second determination unit determines that the first cleaning instruction and the second cleaning instructions have been issued within the predetermined period of time.

4. The virtual tape device according to claim 3, further comprising:
    a first storage unit to store first accumulated times representing periods of time in which virtual tapes have been mounted on respective virtual tape drives included in the first drive group;
    a second storage unit to store second accumulated times representing periods of time in which physical tapes have been mounted on respective physical tape drives included in the physical tape device;
    a calculation unit to calculate, when the second determination unit determines that the first cleaning instruction and the second cleaning instructions have not been issued within the predetermined period of time, a first average accumulated time at which the first information processing apparatus issues cleaning instructions, based on a first accumulated time of the first virtual tape drive and first accumulated times of third virtual tape drives for which cleaning instructions have been issued before the first cleaning instruction; and
    a third instruction unit to instruct physical tape drives having second accumulated times exceeding the first average accumulated time, based on the second accumulated times stored in the second storage unit.

5. The virtual tape device according to claim 4, further comprising:
    second drive groups of virtual tape drives assigned to respective second information processing apparatuses;
    wherein
        the calculation unit calculates second average accumulated times at which the respective second information processing apparatuses issue cleaning instructions, and
        the third instruction unit selects a smallest accumulated time among the first average accumulated time and the second average accumulated times and instructs physical tape drives having second accumulated times exceeding the smallest accumulated time to perform cleaning.

6. A cleaning control method, comprising:
determining by a computer, upon receiving a cleaning instruction for cleaning one of virtual tape drives assigned to an information processing apparatus from the information processing apparatus, whether the cleaning instruction is to be output to a physical tape device connected to the computer; and
instructing, upon determining that the cleaning instruction is to be output to the physical tape device, a physical tape drive corresponding to the one of virtual tape drives to perform cleaning, the physical tape drive being included in the physical tape device.

7. A virtual tape system, comprising:
a physical tape device including a plurality of physical tape drives; and
a virtual tape device connected to the physical tape device, the virtual tape device including:
 a plurality of virtual tape drives,
 a determination unit to determine, upon receiving a cleaning instruction for cleaning one of the plurality of virtual tape drives assigned to an information processing apparatus from the information processing apparatus, whether the cleaning instruction is to be output to the physical tape device; and
 an instruction unit to instruct, when the determination unit determines that the cleaning instruction is to be output to the physical tape device, one of the plurality of physical tape drives corresponding to the one of the plurality of virtual tape drives to perform cleaning.

* * * * *